Sept. 17, 1963

R. F. DYE 3,103,809

APPARATUS AND METHOD FOR MEASURING POLYMER CONCENTRATION

Filed Aug. 1, 1960

INVENTOR.
R. F. DYE
BY *Hudson & Young*
ATTORNEYS

INVENTOR.
R. F. DYE

United States Patent Office 3,103,809
Patented Sept. 17, 1963

3,103,809
APPARATUS AND METHOD FOR MEASURING POLYMER CONCENTRATION
Robert F. Dye, Bartlesville, Okla., assignor to Phillips Petroleum Company, a corporation of Delaware
Filed Aug. 1, 1960, Ser. No. 46,694
6 Claims. (Cl. 73—53)

This invention relates to apparatus and method for determining the degree of polymerization in a polymerization reaction zone and the polymer concentration of the effluent therefrom. In another aspect it relates to periodically sampling an effluent comprising a polymer solution from a polymerization zone to determine the equilibrium vapor pressure. In still another aspect it relates to calibrating the equilibrium vapor pressure as a measure of polymer concentration in the reactor effluent and degree of polymerization.

In the operation of many processes, it is oftentimes desirable to monitor such processes with respect to some variable, which is a function of a second variable that is more readily measurable because of the greater ease of physical determination thereof. One instance of this can be found in the polymerization of a monomer, while dispersed in a carrier, where it is desirable to quickly obtain an approximate measurement of the degree of conversion of the monomer to polymer after a pass through the reactor train. It is well known that the effluent from the reactor train can be manually sampled, the sample then being analyzed in the laboratory for a particular characteristic property, such as polymer concentration. However, conventional sampling and analyzing for the concentration of a solute in a solvent is time consuming; nor is it satisfactory where a round-the-clock, on-the-spot, repetitive measurement of polymer concentration in the reactor effluent is preferred. Moreover, once the sample is removed from the environment of the effluent stream, the degree of polymerization and polymer concentration can no longer be reliably determined by conveniently measuring and comparing the vapor pressure of the feed and effluent stream. This is so because after a time lag the conditions at measurement, no longer represent the conditions in the process stream.

According to this invention, an apparatus is provided, located in close proximity to the process stream to be measured, that continuously samples the process stream. Periodically, but automatically, the apparatus measures the vapor pressure of the stream, in this application, a reactor train effluent. The resulting vapor pressure reading, when properly correlated, approximates the concentration of monomer remaining in the effluent, and simultaneously indicates the degree of polymerization of monomer occurring in the reactor train immediately prior to the time of sampling. The usefulness of this continuous monitoring of the percentage of monomer conversion is soon apparent, for it will readily tell the process operator when, and by how much, the actual degree of polymerization has varied from within allowed limits. The operator can then make any necessary adjustments almost immediately after the upset in the polymerization step is recorded.

It is an object of this invention to provide a method for rapidly determining upsets in the degree of conversion of monomer to polymer in a polymerization zone.

A further object of this invention is to provide apparatus for conveniently and accurately measuring the vapor pressure of the effluent from a reaction zone.

Still another object of this invention is to provide apparatus for correlating the vapor pressure of a polymer solution from a reaction zone with actual polymer concentration in the effluent.

A yet further object is to provide a method of interpreting polymer concentration in a reactor effluent as a measure of the degree of polymerization in the reactor.

Various modifications and alterations of this invention will become apparent to those skilled in the art without departing from the scope and spirit of this invention and it should be understood that the latter is not necessarily limited to the above-mentioned discussion and drawing.

Figure 1:
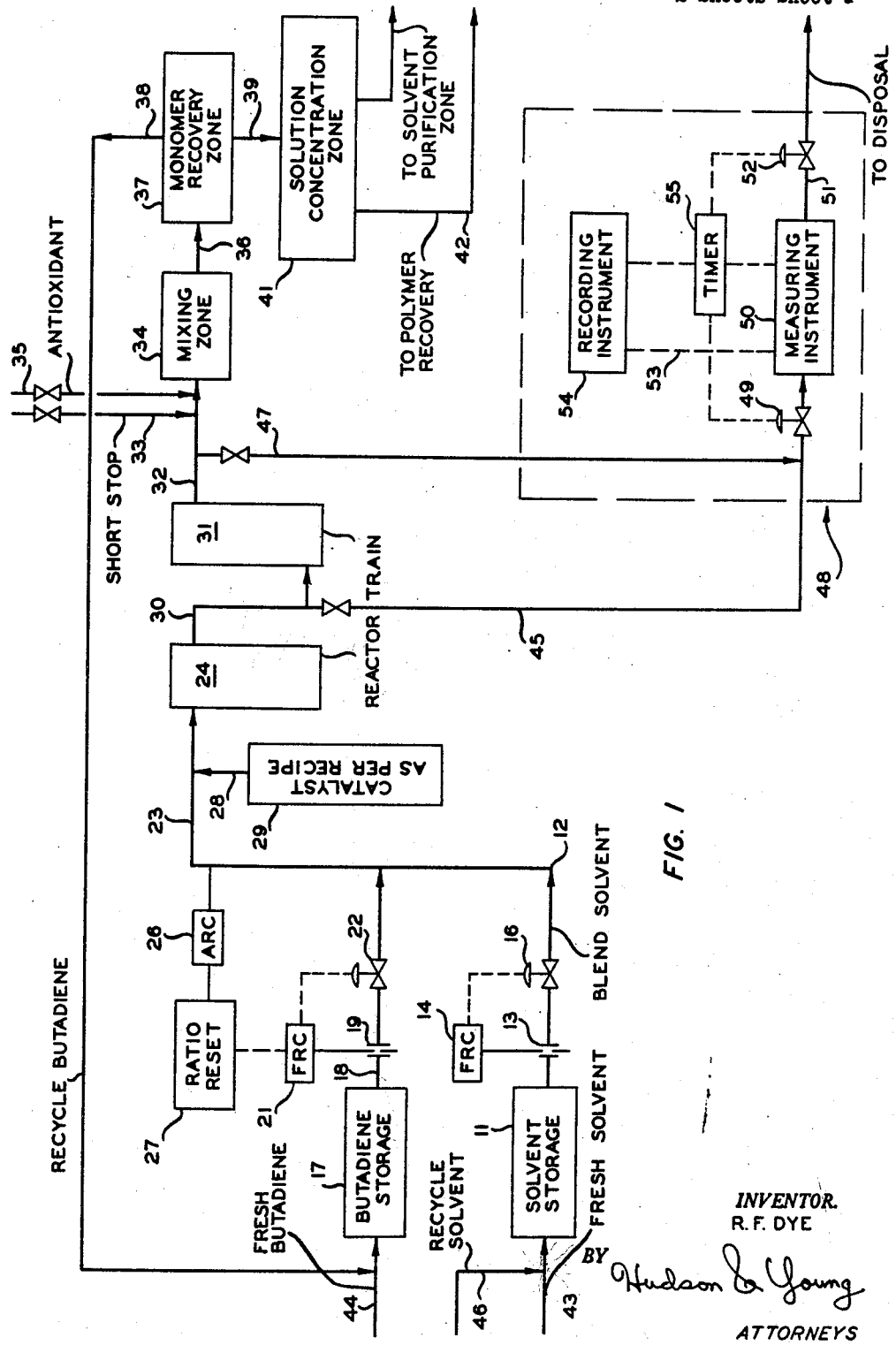
FIGURE 1 is a schematic view of the relation between a polymerization process and the measuring apparatus of this invention.

Referring now to the drawing, wherein like parts have been designated with like reference numerals, and to FIGURE 1 in particular, there is shown a schematic view of a plant in which a monomer, such as butadiene, is reacted to form a rubbery polymer. A solvent diluent, such as toluene, is withdrawn from solvent storage tank 11 via conduit 12. Orifice 13 in conduit 12 is connected to flow rate controller 14 which, in turn, controls motor valve 16, also in conduit 12. Butadiene monomer is withdrawn from butadiene storage tank 17 via conduit 18 and passes to join solvent stream 12. Conduit 18 is also provided with an orifice 19 connected to another flow rate controller 21 which, in turn, directs the operation of motor valve 22 disposed in conduit 18. The monomer and solvent now pass via conduit 23 to the first reactor 24 of a reactor train and analyzer recorder controller 26 and ratio recorder controller 27 are in communication with conduit 23. When the ratio of monomer to solvent varies from prescribed limits as indicated by analyzer recorder controller 26, then ratio recorder controller 27 resets the flow rate controller 21 thereby adjusting the flow of monomer in conduit 18. Controller 26 may be a chromatographic analyzer manufactured by the Perkin-Elmer Company, as described in an article by F. Karasek in the ISA Journal of October, 1948. Controller 27 may be a Foxboro ratio controller, model 40, described in their bulletin 450 at page 55. The valve 22 is adjusted to bring the monomer-solvent ratio back within prescribed limits.

Catalyst is introduced into reactor train inlet conduit 23 via line 28 from tank 29. The resulting admixture passes into first polymerization zone 24 where conversion of butadiene monomer to a stereospecific polybutadiene occurs. The effluent from zone 24 passes on via line 30, additional conversion of monomer, beyond that effected in zone 24, occurs in second polymerizaiton zone 31. It is assumed for the purpose of describing this invention that with this monomer and catalyst system that, a 60% conversion is the optimum for the entire reactor train. Effluent containing some unreacted monomer, polymer, solvent, and minor amounts of other materials is withdrawn from zone 31 via line 32. A suitable shortstopping agent is added through conduit 33 to effluent of conduit 32. A suitable antioxidant agent is also added thereto through conduit 35. The resulting stream passes through a mixing zone 34, and line 36 into monomer recovery zone 37, wherein recovery of unreacted butadiene monomer is effected and recycled to monomer storage tank 17 via conduit 38. A substantially monomer-free, polymer solution passes on via conduit 39 to a solution concentration zone 41, and therefrom via conduit 42 to subsequent polymer recovery steps (not shown).

It will be noted that the solvent and monomer storage tanks 11 and 17, respectively, are provided with inlet lines 43 and 44, respectively, for supplying fresh solvent or monomer as make-up, as the need may be. An additional conduit 46 is in communication with a solvent purification zone (not shown), which, in turn, communicates with solution concentration zone 41. Conduit 46 passes purified recycle solvent to solvent storage 11 via conduit 43.

Returning to the effluent from second polymerization zone 31 of reactor train, it is seen that either small conduits 45 or 47 is continuously withdrawing a sample stream from effluent conduit 30 or 32, respectively. The sample stream passes to a measuring and recording apparatus, generally designated 48. Sample stream 45 or 47 passes through an inlet motor valve 49, through a measuring instrument 50, and therefrom via conduit 51 having a second motor shut-off valve 52 disposed therein, to disposal. Measuring instrument 50 is in pneumatic communication via line 53 with a standard, strip-chart recording instrument 54. A timer mechanism 55 is in electrical communication with automatic valves 49 and 52, measuring instrument 50, and recording instrument 54.

Figure 2:
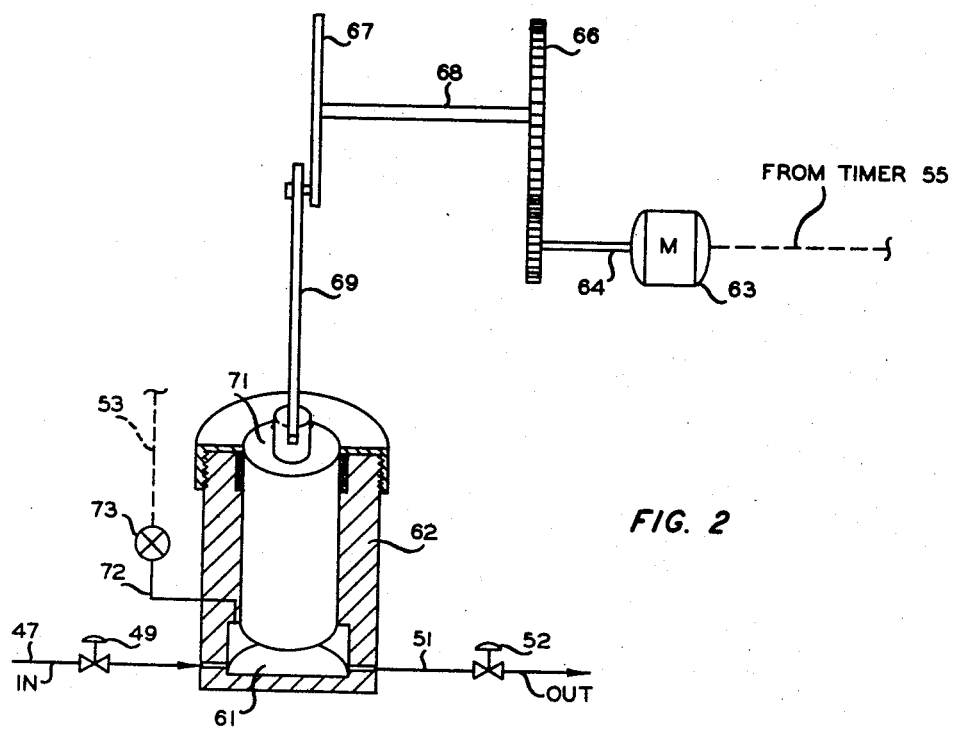
FIGURE 2 is a detailed view, in partial section, of the measuring apparatus of this invention.

In FIGURE 2 is shown, in partial section, a detail view of the measuring instrument 50 of this invention. The sample stream from conduit 47 continuously enters lower cavity 61 of hollow cylinder 62. When a measurement is desired to be made, the signal is passed from timer 55 closing both motor valves 49 and 52, and thereby trapping a slug of sample in lower cavity 61. Promptly, another signal from timer 55 to drive motor 63 actuates the same. Motor shaft 64 thereof starts to drive ratchet wheel 66. The driver wheel 67 on the other end of connecting shaft 68 is operatively secured to connecting rod 69 near its perimeter. As driver wheel 67 is rotated, raising connecting rod 69, plunger 71 is withdrawn from the chamber 62 through the length thereof. The changing vapor pressure of the trapped sample passes by capillary 72 to a transmitter 73 and from thence via pneumatic signal transmission means 53 to recording instrument 54.

After having reached the top of its travel, connecting rod 69 begins to descend, driving plunger 71 back into cylinder 62. When plunger 71 reaches the bottom of its travel, signal from timer 55 opens valves 49 and 52 permitting the pressure-exhausted, sample slug to escape to disposal via conduit 51 and the flow of fresh sample stream therethrough to resume. After plunger 71 is fully lowered, measuring instrument 50 is ready for another measurement, after a purge time, or whenever timer 55 directs closing of valves 49 and 52, trapping another sample therein.

Figure 3:
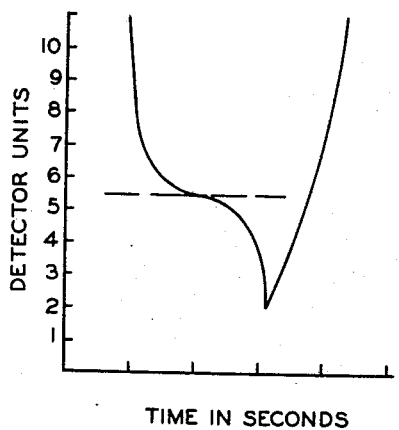
FIGURE 3 is a typical recording of an equilibrium vapor pressure determination on a strip chart of a recording instrument employed in conjunction with this invention.

In FIGURE 3, there is shown a recorded tape of the strip-chart type, which is preferred, indicating the nature of a single measurement as recorded by instrument 50. To conserve strip-chart, the chart drive is actuated only shortly after plunger 71 begins its upward ascent. This is because the scale (time) on the horizontal axis is best calibrated in units of seconds. Accordingly, the chart drive is stopped just before plunger 71 completes its cycle, that is, completely lowered into cylinder 62 on its return stroke.

As indicated by the plot on the strip-chart, when the plunger is moving upward, the system pressure is dropping, that is, the static "head" is being removed. As the curve changes direction, the inflection point indicates that saturation, or equilibrium vapor pressure, has been reached. After 100% saturation, with the continued expanding chamber volume, auto-refrigeration sets in, and the vapor pressure drops sharply to the low point noted by which time the plunger has reached the top of its travel. As the plunger resumes its downward movement into chamber 62, the system pressure, or its equivalent recorder reading, begins to rise until above the recorder scale, and/or until the chart drive is shut off.

The relationship between vapor pressure of the solution and solute concentration will now be explained. The generalization known as Raoult's law states that the equilibrium vapor pressure which is exerted by a component in a solution is proportional to the mole fraction of that component. Assuming that Raoult's law were to hold for the present situation then $$p_i = P_i \times X_i$$

| partial pressure of component $i$ | saturated vapor pressure of component $i$ | Mole fraction of component $i$ in liquid phase |
|---|---|---|

Vapor pressures @ 40° F. of:             P.s.i.
  Butadiene _____ 20.6
  Toluene _____ 0.235

An illustration of calculation:

Reactor charge is 100 parts butadiene per 1200 parts toluene.

Basis:                                                     Mols
  100 pounds butadiene_____ 1.85
  (Molecular weight=54)
  1200 pounds toluene_____ 13.05
  (Molecular weight=92)

Total mols_____ 14.90

Thus,

Mol fraction butadiene_____ 1.85/14.95=0.124
Mol fraction toluene_____ 13.05/14.95=0.876

1.000

"Vapor" pressure or total pressure of this solution would be (@ 40° F.):

$$(20.6)(0.124) + (.235)(.876) = 2.76 \text{ p.s.i.}$$

which corresponds to zero percent conversion of monomer.

Vapor pressure at 60% conversion (or 40% butadiene remaining) would be:

$$(20.6)(0.124)(.40) + (.235)(.876) = 1.23 \text{ p.s.i.}$$

Also, for 30% conversion (70% monomer remaining:

$$(20.6)(0.124)(.70) + (.235)(.876) = 2.00 \text{ p.s.i.}$$

Thus, a curve could be readily drawn showing the percentage conversion of monomer as a function of vapor pressure. Moreover, it should be obvious that polymer concentration is directly proportional to percent conversion.

In a practical situation the butadiene charged will not be 100% purity, and butylenes will be present in the feed. These do not disappear (polymerize), and the process purge rate is set so as to maintain a given level of these butylenes, so their effect on the calculated curve is known. In present polybutadiene plant design, purity of blended butadiene is 95 weight percent, changing the mol fraction to 0.119. In this case, vapor pressure of a 30% converted effluent would be:

$$(20.6)(0.119)(.70) + (20.6)(.005) + (.235)(.876) = 2.05 \text{ p.s.i.}$$
    v.p. of butene-1 estimated to be same as butadiene Since, as noted, Raoult's law represents only a more or less approximation of actual conditions, and when dealing with a process stream having varying amounts of solutes in solvents, it is preferable to make an empirical calibration of solution vapor pressure, and/or recorder readings, as a function of polymer concentration in the effluent from the reactor train.

The correlation between recorder readings and equilibrium vapor pressure of the polymer solution is first determined in the apparatus of this invention. Actual samples of polymer solution of varying, but known, concentrations, and all at the same temperature as the polymerization zone effluent, are run through the vapor pressure measuring device 50.

Figure 4:
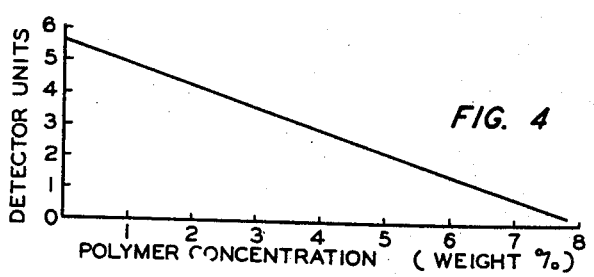
FIGURE 4 is a curve illustrating the relation between recorder readings and polymer concentration.

The inflection points in the resulting recordings on the strip-chart are taken as the recorder readings, which readings are noted and plotted against the corresponding known polymer concentration, as shown in FIGURE 4. Once this calibration is established, and by using this calibration curve, a recorder reading for a sample of polymer solution of unknown concentration can be quickly converted to the polymer concentration measurement itself. Alternatively, with the correlation curve in hand, it is possible to calibrate the strip-chart to read in units of polymer concentration directly, thereby dispensing with the need for reference to the correlation curve in order to find the polymer concentration of the reactor effluent.

Additionally, a relationship can be calculated and plotted, indicating recorder readings as a function of percent conversion of monomer, if such a correlation is preferred. The foregoing calculations regarding the pertinency of Raoult's law indicate how this may be done.

An example of the importance of the timeliness of the measurement of polymer concentration in the reactor train effluent follows: For a given polymer concentration in effluent line 32, there is a prescribed rate of addition of shortstopping agent and antioxidant agent to conduit 32, through feed lines 33 and 35, respectively. When a change occurs in the polymer concentration of line 32, this is recorded and then observed on recording instrument 54 by the process operator. He may then manually adjust the flow rate in feed lines 33 and 35, to maintain the proper rate of addition of agents relative to the amount of polymer in the effluent stream.

Alternatively, where employing the measuring instrument of this invention, a closed loop circuit (not shown) can be installed between the polymer concentration recording instrument 54 and motor valves (not shown) on the shortstop and antioxidant feed conduits. In this manner, polymer concentration determination according to this invention can automatically maintain the proper weight ratio of the above agents to the polymer. This makes for greater economy in the use of said agents and/or a more uniform polymer product.

Various modifications and alterations of this invention will become apparent to those skilled in the art without departing from the scope and spirit of this invention and it should be understood that the latter is not necessarily limited to the above-mentioned discussion and drawing.

I claim:

1. Analysis apparatus comprising a chamber; a piston positioned for movement within said chamber; an inlet conduit communicating with said chamber at a first point adjacent one end of said chamber; an outlet conduit communicating with said chamber at a second point adjacent said one end; first and second valves in said inlet and outlet conduits, respectively; means communicating with said chamber at a third point also adjacent said one end to measure the equilibrium vapor pressure of a liquid confined within the region of said chamber between said piston and said first and second points; and control means to (1) close said first and second valves, (2) move said piston away from said one end while said valves are closed, and (3) move said piston back toward said one end while said valves remain closed.

2. A method of determining the polymer concentration in a solvent by the equilibrium vapor pressure thereof comprising the steps of: passing a sample of the polymer and solvent to be measured to a confined zone, increasing the volume of said zone, thereafter decreasing the volume of said zone, and continuously measuring the pressure within said zone while said volume is increased and decreased, whereby the measured pressure is representative of the polymer concentration.

3. A vapor pressure analyzer for a polymer solution comprising, in combination, a sample conduit from a process stream, vapor pressure measuring means in said sample conduit, said measuring means comprising a chamber, a piston disposed therein, a cycle timing means, mechanical means connected to said cycle timing means for raising and lowering said piston as desired, first and second valve means disposed at the inlet and outlet ends, respectively, of said measuring means, electrical means connecting said timing means to said first and second valve means and said measuring means, so that said piston is adapted to reciprocate only during the time that both said valve means are closed, and conduit means for passing a pneumatic signal from said vapor pressure measuring means to a recording device.

4. A method of determining the polymer concentration in a solvent by the equilibrium vapor pressure thereof comprising the steps of: drawing a sample from a process stream, passing the sample to a vapor pressure measuring device and measuring the equilibrium vapor pressure therein, converting the measured pressure to a pneumatic signal representative thereof, passing the resulting pneumatic signal to an equilibrium vapor pressure recording means calibrated for polymer concentration, recording the equilibrium vapor pressure thereon, and reading the polymer concentration from said recording means.

5. A method of determining the polymer concentration in a solvent comprising the steps of: drawing a sample from a process stream, passing the sample to a vapor pressure measuring device and measuring the equilibrium vapor pressure therein, converting the measured pressure to a pneumatic signal representative thereof, passing the resulting pneumatic signal to a recording means calibrated for polymer concentration, recording the equilibrium vapor pressure thereon, reading the polymer concentration from said recording means, and passing the sample to disposal to prepare the measuring device for the next sample of polymer solution to be analyzed.

6. A method of determining polymer concentration in a solvent comprising the steps of: continuously passing a small portion of a process stream through a sample conduit and the chamber of a vapor pressure measuring means disposed therein, trapping a volume of said process stream in said chamber, slowly raising a piston disposed in said chamber from the fully closed position to the fully open position, simultaneously passing the vapor pressure impulse from said trapped solution in said chamber to a pneumatic recording instrument, recording the variation in vapor pressure of said solution thereon during the cycle of operation of said piston, slowly lowering said piston to the fully closed position to prepare for another analysis cycle, and opening the said chamber thereby permitting the pressure-exhausted sample slug to flow out of said chamber to disposal and admitting a fresh volume of process stream to said chamber.

References Cited in the file of this patent

UNITED STATES PATENTS

| | | |
|---|---|---|
| 1,282,120 | Patterson | Oct. 22, 1918 |
| 1,368,147 | Hennebohle | Feb. 8, 1921 |
| 2,725,742 | Crooks | Dec. 6, 1955 |
| 2,764,017 | Ronnebeck | Sept. 25, 1956 |